(12) United States Patent  (10) Patent No.: US 9,385,495 B1
Hilbert  (45) Date of Patent: Jul. 5, 2016

(54) WEIGHT SUPPORTING SLIP RING

(71) Applicant: Andrea Angelo Hilbert, Mechanicsville, MD (US)

(72) Inventor: Andrea Angelo Hilbert, Mechanicsville, MD (US)

(*) Notice: Subject to any disclaimer, the term of this patent is extended or adjusted under 35 U.S.C. 154(b) by 21 days.

(21) Appl. No.: 14/611,196

(22) Filed: Jan. 31, 2015

(51) Int. Cl.
| H01R 39/64 | (2006.01) |
| H01R 39/10 | (2006.01) |
| H01R 39/28 | (2006.01) |
| F16C 19/30 | (2006.01) |
| F16C 19/46 | (2006.01) |
| F16C 41/00 | (2006.01) |

(52) U.S. Cl.
CPC ............ H01R 39/643 (2013.01); F16C 19/305 (2013.01); F16C 19/463 (2013.01); F16C 41/004 (2013.01); H01R 39/10 (2013.01); H01R 39/28 (2013.01); H01R 39/64 (2013.01)

(58) Field of Classification Search
CPC ....... H01R 39/12; H01R 39/28; H01R 39/643
See application file for complete search history.

(56) References Cited

U.S. PATENT DOCUMENTS

| 3,042,998 | A |   | 7/1962  | Sweett |              |
| 3,119,907 | A | * | 1/1964  | Wilson ................ | H01R 39/643 |
|           |   |   |         |        | 200/19.09   |
| 3,179,909 | A | * | 4/1965  | Cheney .................... | G11B 5/52 |
|           |   |   |         |        | 336/120     |
| 3,581,267 | A | * | 5/1971  | Schreffler ............... | F16C 33/60 |
|           |   |   |         |        | 439/17      |
| 4,992,691 | A |   | 2/1991  | Mlynarz |             |
| 5,851,120 | A | * | 12/1998 | Sobhani ............... | H01R 39/643 |
|           |   |   |         |        | 439/13      |
| 5,901,429 | A |   | 5/1999  | Crockett |            |
| 5,923,114 | A |   | 7/1999  | Senni |               |
| 6,132,219 | A | * | 10/2000 | Sobhani ............... | H01R 39/643 |
|           |   |   |         |        | 439/17      |
| 6,299,454 | B1| * | 10/2001 | Henderson ............. | H01R 39/64 |
|           |   |   |         |        | 439/15      |
| 6,603,233 | B2| * | 8/2003  | Strohm .................. | H02K 31/02 |
|           |   |   |         |        | 310/112     |
| 6,984,915 | B2|   | 1/2006  | Galyean |             |
| 8,425,123 | B2| * | 4/2013  | Draser .................... | F16C 33/58 |
|           |   |   |         |        | 384/484     |
| 2002/0034887 | A1 | * | 3/2002 | Dollhofer ............ | H01R 39/643 |
|           |   |   |         |        | 439/17      |
| 2003/0073325 | A1 | * | 4/2003 | Canizales, Jr. ....... | H01R 39/643 |
|           |   |   |         |        | 439/17      |
| 2008/0121162 | A1 | * | 5/2008 | Erstad .................. | B63B 21/507 |
|           |   |   |         |        | 114/230.12  |
| 2010/0303397 | A1 | * | 12/2010 | Draser ................. | F16C 19/466 |
|           |   |   |         |        | 384/572     |

* cited by examiner

Primary Examiner — James Harvey

(57) ABSTRACT

A slip ring assembly is disclosed allowing significant external weight on either the stationary or rotating sides of the slip ring. Additionally, a slip ring assembly is disclosed allowing multiple small, linear, rolling contacts on each conductive ring of each electrical receiver disk of the slip ring (both the stationary and the rotating electrical receiver disks). Disclosed is an embodiment of a separator plate having a spiraling-out-from-the-center series of holes and in those holes of the separator plate are the small linear rolling, contacts. In one embodiment each spiraling series of holes with small the rolling contacts provides one rolling contact on each electrical conductive ring on each receiver disk. These spiral rings enable a slip ring designer to provide multiple rolling contacts on each circular electrical conduction ring by simply increasing the number or spiraled series of holes.

20 Claims, 12 Drawing Sheets

WEIGHT SUPPORTING SLIP RING

CROSS-REFERENCE TO RELATED PATENTS

The present application claims the benefit of the provisional application 61/934,423 filed Jan. 31, 2014.

FIELD OF INVENTION

The present invention relates to slip ring assemblies, and more particularly, to a slip ring capable of supporting significant weight on the rotating or stationary outer shell of the slip ring.

BACKGROUND OF INVENTION

A slip ring is an electromechanical device that allows the transmission of power and electrical signals from a stationary to a rotating structure, or the reverse, from a rotating to a stationary structure. Slip rings are used in a wide variety of electromechanical systems such as rotating robotic arms, rotating satellite dishes, and in a wide variety of electronic motors having rotating parts, stationary parts, and the requirement to transfer electrical current between those parts. Current slip ring designs allow for transfer of electrical current or electrical signals by various means, but require no external pressure form large weights on the rotating or stationary parts of the slip ring while performing the slip ring electrical transfer.

There are a wide variety of slip ring configurations, ranging from tubular shapes of varying lengths to flat disk shapes of varying diameters. But whatever the design current slip ring designs do not allow significant pressure form external weights on either the stationary or rotating portions of the slip ring. This external weight restriction is crucial in current slip ring designs. If significant weight pressure is applied to the slip ring while it's operating the slip ring will fail to operate. No current slip ring design has sufficiently addressed the problem of external weight pressure on the slip ring.

Additionally, current slip ring designs have maintenance issues because of the slip ring design. Some slip rings use electrically conductive brushes on an electrically conductive surfaces, as seen in U.S. Pat. No. 4,992,691 A (Mlynarz), but friction between these two parts eventually causes deterioration of the brushes or on the electrically conductive, rotating surfaces.

U.S. Pat. No. 5,923,114 A (Senni) uses electrically conductive spherical balls and cylindrical rods (or pins). Senni's use of pins provides a line contact between the static and rotating components instead of the multiple point contacts in the brush type slip rings. However, Senni's design restricts significant weight on either the stationary or rotating parts.

Other attempted solutions have tried a tubular style of slip ring, but this has not sufficiently addressed the significant weight pressure on a slip ring. The tubular style of slip ring reveals another design problem in prior art slip ring designs, the length of the stator tube. As the quantity of wires, electrical current, and electrical signal requirements increase, the length and width of the slip ring must increase in order to compensate for these added requirements. For example, U.S. Pat. No. 3,042,998 A (Parsley, Herbert, Henry, Smith) discloses a slip ring dealing with increased wires, electrical current, and electrical signal requirements and a flat disk slip ring compensates for the increased electrical requirements by increasing the diameter and thickness of the slip ring unit. But the design still restricts significant weight on either the stationary or rotating parts.

An example of a flat slip ring or pancake design is disclosed in U.S. Pat. No. 6,984,915 B2 (Galyean) and by U.S. Pat. No. 5,901,429 (Crockett). Each demonstrates the use of a plurality of concentric annular rings made of conductive material. In all these designs the number of wires and power draw will increase the size of the slip ring, and the size of the slip ring drives important overall design considerations in the overall end product. Design considerations such as how and where a larger slip ring will fit in the end product.

For example, the size of the slip ring is a key consideration in the development of a robotic arm base. The robotic designer has to consider the size and location of the slip ring while designing the robotic arm. The demands for higher power or more wires feeding into the slip ring increases the length or width of the tubular style slip ring, or the diameter or thickness of a pancake style slip ring, and as the length of the slip ring increases, the height of the robotic arm base must also increase. As the height increases, the production unit's center of gravity rises and the base must grow broader or heavier as a counterbalance.

The use of pancake style slip rings allows the robotic arm base to remain lower but increases the width of the slip ring to produce a stable overall unit. Thus, a key drawback of the pancake style slip ring in robotic arms or other slip ring locations is the amount of clear surface area required for the slip ring to operate.

An additional problem with current slip ring designs is the amount of surrounding equipment one has to remove to access the slip ring for maintenance or replacement.

Thus, a slip ring design is needed that will (a) allow significant external weight pressure on either the stationary or rotating sides of the slip ring, (b) improve the mechanical performance of the slip ring by simplifying the slip ring operation, (c) eliminate damage-prone wires from dangling on movable joints; and (e) allow simplified access the slip ring for maintenance or replacement of the slip ring. Additionally, these design improvements would dramatically reduce both production and maintenance costs.

SUMMARY

Slip ring embodiments disclosed herein (a) allow significant weight on either the stationary or rotating sides of the slip ring, (b) improve the mechanical performance of the slip ring by simplifying the slip ring operation, (c) eliminates damage-prone wires from dangling on movable joints; and (e) allows simplified access the slip ring for maintenance or replacement of the slip ring.

The disclosed embodiments of the present invention reveals a slip ring design capable of bearing significant weights, weights far in excess of any current slip ring design. One embodiment discloses a needle roller bearing unit on the outer edge of the slip ring whereby any significant external weight pressure on the slip ring is applied to the needle roller bearing, allowing the slip ring to operate free from that weight pressure. Additionally, the needle roller bearing unit can be placed around the inner, central core of the slip ring, allowing external weight pressure to press more on the central portion of the slip ring.

A second feature of the disclosed embodiments is the method of transferring electrical energy between the slip ring subsystems. A brushless approach is disclosed (a) having the electrical transfer equipment placed directly onto the slip ring solving the height issue of the tubular slip rings and base clearance issue of the pancake slip rings, and (b) disclosed embodiments have multiple points of electrical contact between the static and rotating components of the slip ring allowing a more consistent, steady, interruption-free exchange of electrical signals between the rotating and stationary parts of the slip ring.

Finally, the disclosed embodiments of the present invention result in a significant reduction in production and maintenance costs because only the upper unit of the slip ring need be removed to access all parts of the the slip ring for maintenance or removal and replacement of the slip ring.

These, and other, aspects of the invention will be better appreciated and understood when considered in conjunction with the following description and the accompanying drawings. The following description, while indicating various embodiments of the embodiments and numerous specific details thereof, is given by way of illustration and not of limitation. Many substitutions, modifications, additions or rearrangements may be made within the scope of the embodiments, and the scope of the invention includes all such substitutions, modifications, additions or rearrangements.

DETAILED DESCRIPTION

Figure 1:
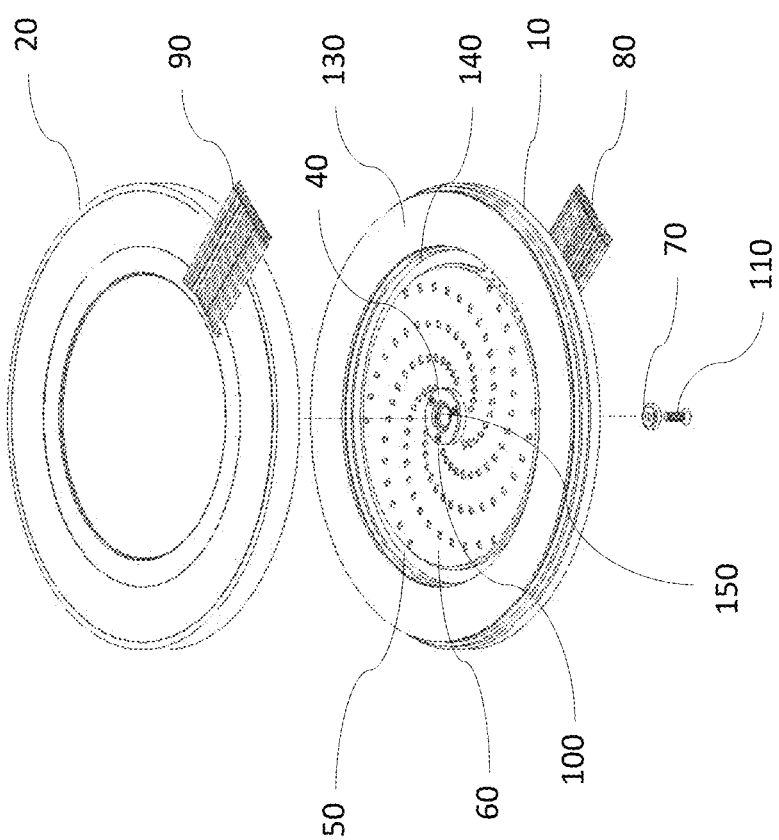
FIG. 1 is an exploded isometric view of the two halves of the one embodiment of the disclosed slip ring.

While the present invention is susceptible of various forms and embodiments, shown in the drawings and hereinafter described are multiple embodiments of the invention, with the understanding that the present disclosure is an exemplification of the invention, and is not intended to limit the invention to the specific disclosed embodiments.

As noted, the present invention relates to multiple fields that incorporate stacked rotating components that require slip ring power or slip ring signal transfers such as a rotating robotic arm design, rotating satellite dishes, or any other device requiring one part to rotate relative to another part and transfer electrical current between them.

With reference first to FIG. 1, two main parts of the first embodiment are shown: the upper section the outer shell, top lid 20, with hook-up wire set two 90 protruding through top lid 20, and the lower section, outer shell, bottom pan 10 with the hook-up wire set one 80 protruding through bottom pan 10. Inside bottom pan 10 bearing assembly 150 guides and controls bearing shaft 23 (shown in FIG. 7A) on top lid 20. Bearing outer race retainer 40 captures the outer race of the bearing assembly 150 allowing the inner race of the bearing assembly 150 to move freely. Three screws 100 fasten bearing outer race retainer 40 to the bottom pan 10, and screw 110, is placed through bearing inner race retainer 70. Within bottom pan 10 is located needle roller bearing assembly 140. It is positioned between two needle roller bearing washers 130 one above and one below needle roller bearing assembly 140. Needle roller bearing assembly 140 is the component that permits the slip ring to support significant weights on either top lid 20 or bottom pan 10. The maximum weight of the slip ring capacity of this embodiment is 1,000 pounds. But weights up to 10,000 pounds are feasible with this slip ring weight bearing design. Thus, the disclosed slip ring can easily adjust to support significant external weights, far greater that any known slip ring design, and a slip ring designer can adjust the needle roller bearing assembly 140 to support any reasonable weight, any feasible weight, used in slip ring products.

The position of the needle roller bearing 140 is set so it bears the external pressure load. In one embodiment, the needle roller bearing assembly 140 sits slightly higher within the outer shell, bottom pan 10, allowing the inner slip ring to operate freely when a weight is pressing down on the top lid 20 of the slip ring assembly.

But, there are multiple variations for needle roller bearing 140 position to operate and keep external weight pressures off the inner slip ring parts. For example, the slip ring might be designed to look like a top hat where the needle roller bearing 140 is either much lower or higher than the position of the internal electrical receiver disks of the slip ring, or the needle roller bearing 140 could have a flat disk orientation. Any of these positions would work as long as the external pressure load on the overall slip ring unit is applied to the needle roller bearing 140.

The same design choices hold for the central portions of the slip ring where a shaft or an external weight-bearing object could be placed. The needle roller bearing 140 would then be either on the outside the internal slip ring or within the slip ring, around the center hole of the circular slip ring parts. The electrical receiver disks could then to be higher or lower or on the same plane as the slip ring, as long as the design keeps the external weight pressure load on the needle roller bearing 140 and not on the slip ring electrical receiver disks. Regardless of the location of the slip ring electrical receiver disks and the needle roller bearings, they all must be concentric to each other.

Figure 2:
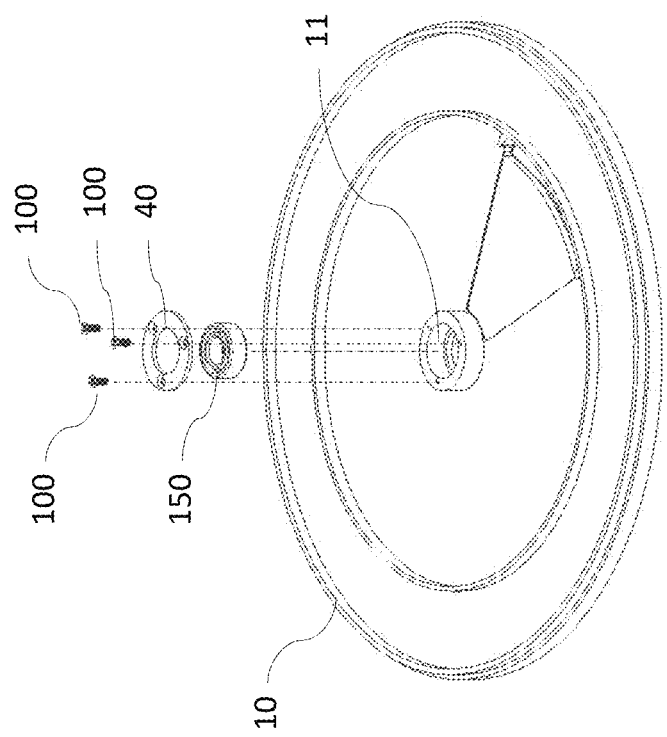
FIG. 2 is an exploded isometric view of the centrically located bearing assembly and retainer with attaching hardware of FIG. 1.

FIG. 2 shows the details of bearing assembly 150 installed in bottom pan 10. In bottom pan 10 is inner bearing seat 11 which houses bearing assembly 150. Bearing assembly 150 rests on a surface within inner bearing seat 11, just large enough to support the outer race of bearing assembly 150. Bearing outer race retainer 40 is fully within the outer race of bearing assembly 150. Three screws 100 hold bearing outer race retainer 40 securely to bottom pan 10, holding bearing outer race retainer 40 in place.

Figure 3:
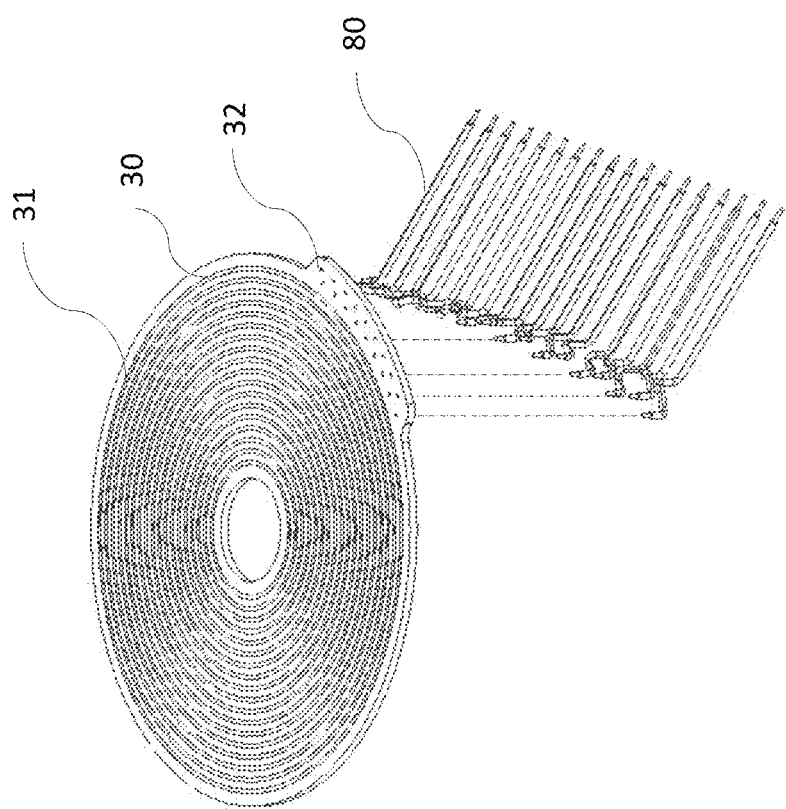
FIG. 3 is an exploded isometric view of electrical receiver disk one and hook-up wire set one.
Figure 3A:
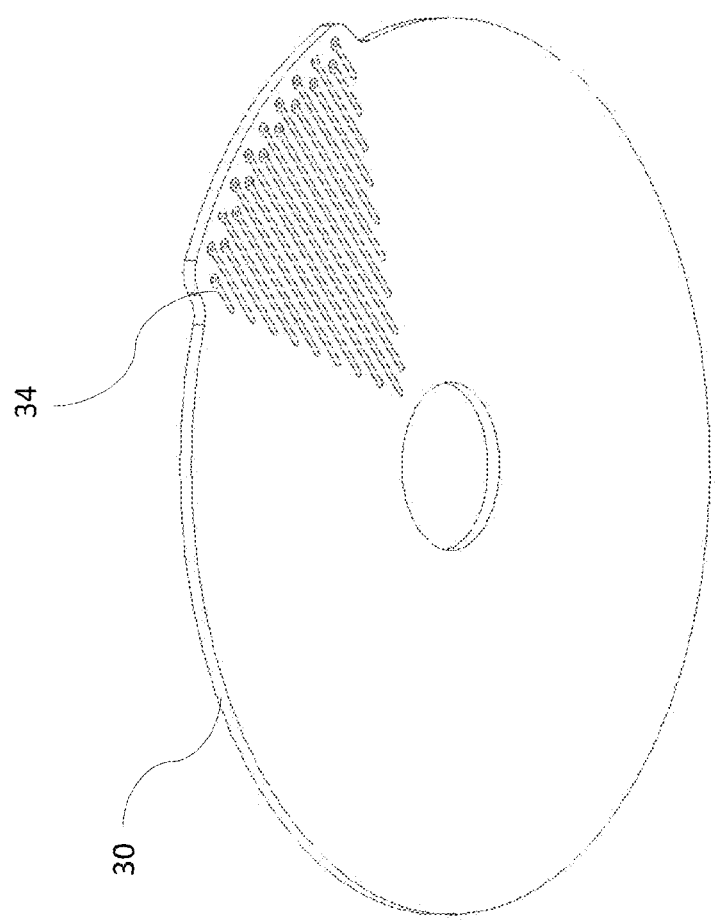
FIG. 3A is an isometric view of the linear traces on side two of electrical receiver disk one, shown in FIG. 3.

FIG. 3 shows details of the electrical receiver disk one 30. Electrical receiver disk one 30 has two sides, side one and side two. Circular traces 31 are on side one of electrical receiver disk one 30 and linear traces 34 are on side two (see in FIG. 3A). And, in this embodiment, hook-up wire set one 80 has 18 individual hook-up wires. FIG. 3 shows the 18 circular traces 30 arrayed and ready for installation into side two of electrical receiver disk one 30. FIG. 3A shows side two of electrical receiver disk one 31, which has 18 linear traces 34. Linear traces 34 on side two of electrical receiver disk one 31 electrically connects to the circular traces 30 on side one of electrical receiver disk one 31, electrically connecting in at least one spot, and connecting through electrical receiver disk one 31.

Linear traces 34 receive external electrical power applied through hook-up wire set one 80. Solder connections 32 are ground flat to remove any solder material protruding from hook-up wire set one 80 when connected to solder connections 32. These ground flat solder connections 32 should not exceed 0.018 inches, in this embodiment, on side one only of electrical receiver disk one 30. These connection requirements are needed to ensure hook-up wire set one 80 at solder connections 32, during operation, do not contact solder hook-up wires set two 90 at solder connections 163 on electrical receiver disk two 160, (seen in FIG. 6).

Figure 4:
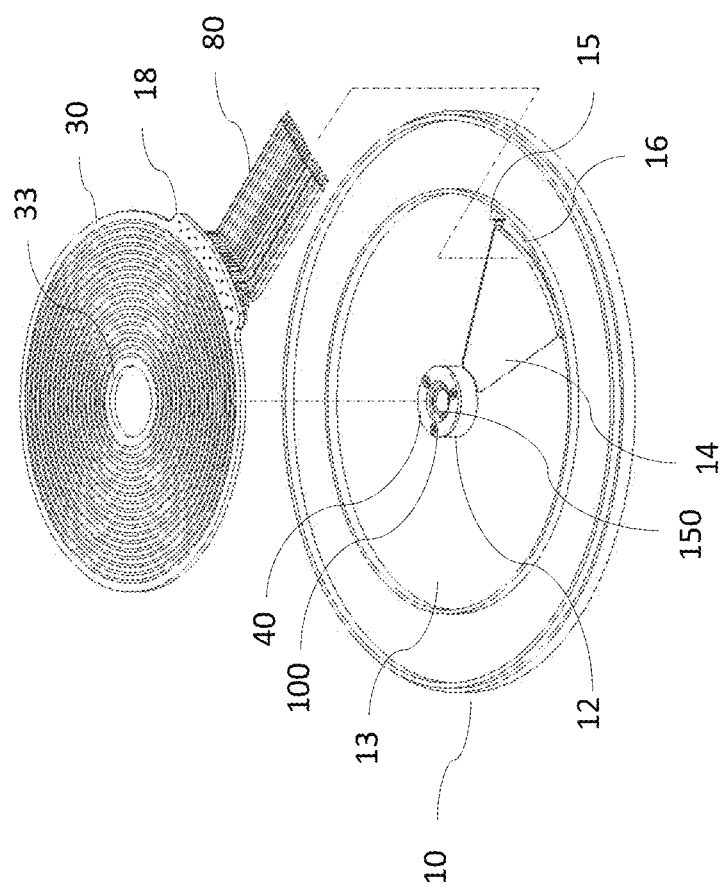
FIG. 4 is an exploded isometric view of the combined slip ring parts shown in FIG. 2 and FIG. 3.

FIG. 4 shows the connection of the slip ring parts shown in FIG. 2 and FIG. 3. Electrical receiver disk one 30 and hook-up wire set one 80 are installed in bottom pan 10 by inserting each wire in through exit port 16 in bottom pan 10, so the wires protrude through bottom pan 10. Within the bottom pan 10 is trace cavity 14, which gives clearance to linear traces 34 (shown in FIG. 3A) on electrical receiver disk one 30, second side. Trace cavity 14 ensures that no electrical shorts will occurs when a pressure load is applied to the slip ring during operation. Electrical receiver disk one 30 is located in cavity 13 in bottom pan 10, and tab 18 on electrical receiver disk one 30 is positioned between two anti-rotation bosses 15 in bottom pan 10. Bearing outer race retainer 40, screw 100, and bearing assembly 150, are shown assembled in bottom pan 10, and mounted to center post 12. Electrical receiver disk one 30 located in bottom pan 10, through its center mounting hole 33 and positioned between the two anti-rotation bosses, (one anti-rotation boss 15 is shown in bottom pan 10). The anti-rotation bosses 15 prevent electrical receiver disk one 30 from twisting within bottom pan 10 during operation.

Figure 5:
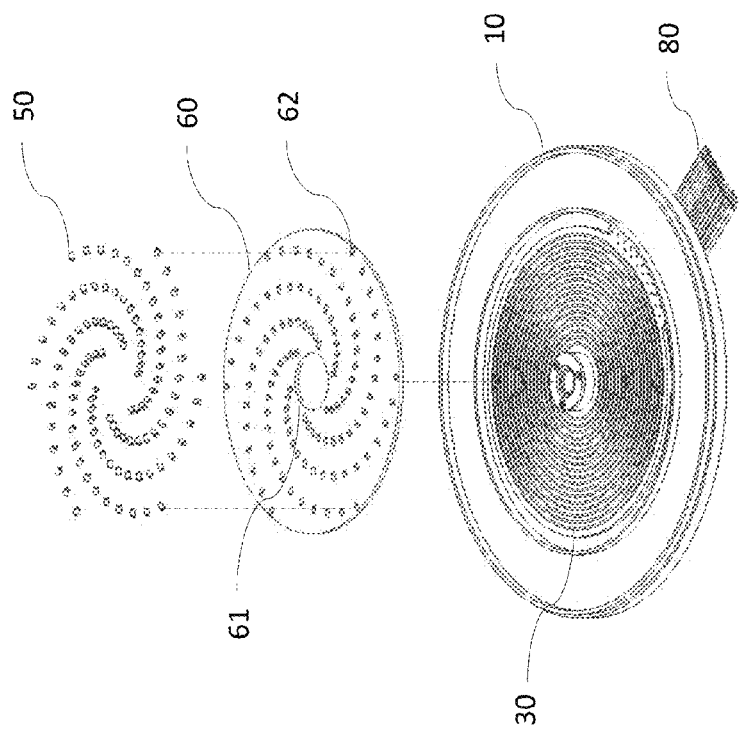
FIG. 5 is an exploded isometric view of slip ring parts in FIG. 4 and a separator plate and its contacts.

FIG. 5 discloses separator plate 60 and a set of small linear rolling contacts 50. Separator plate 60 fits into the bottom pan 10, between electrical receiver disk one 30 and electrical receiver disk two 160. Separator plate 60 is aligned and mounted onto the center post 12 (shown if FIG. 4) of the bottom pan 10, through mounting hole 61.

Figure 6:
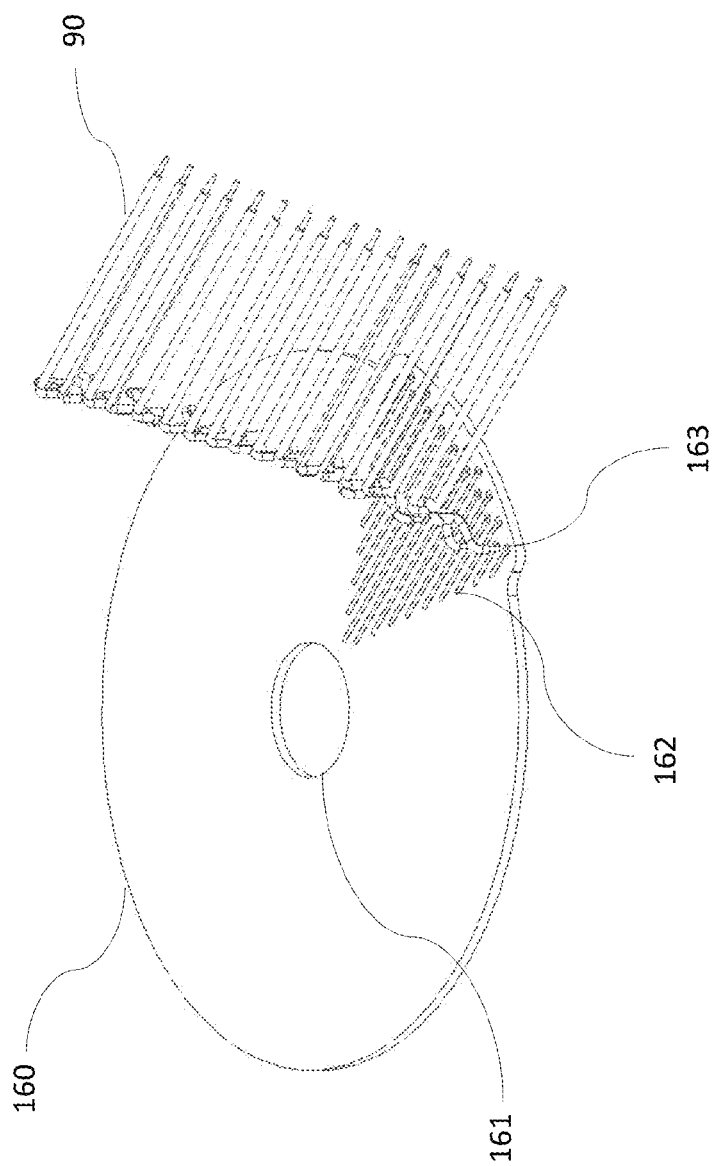
FIG. 6 is an exploded isometric view of side two of electrical receiver disk two and hook-up wire set two.

Each contact hole 62 in separator plate 60 contains one linear rolling contact 50 and each linear rolling contact 50 is electrically conductive, transmitting electrical current through the contact 50 as is rolls over the circular traces in electrical receiver disk one 30 and electrical receiver disk two 160 (shown if FIG. 6).

In the disclosed embodiment, 108 individual linear rolling contacts 50 are used. Each linear rolling contact 50 fits into one contact hole 62 in separator plate 60. 18 individual linear rolling contacts 50 are in each spiral shaped line of holes in separator plate 60, in this embodiment there are six spiral shaped lines. Thus, six linear rolling contacts 50 roll over and contact each circular trace 31 (shown if FIG. 3) on electrical receiver disk one 30. Each contact hole 62 in separator plate 60 contains one linear rolling contact 50 and each linear rolling contact 50 is electrically conductive, transmitting electrical current through the contact 50 as is rolls over the circular traces in electrical receiver disk one 30 and electrical receiver disk two 160. In the disclosed embodiment, 108 individual linear rolling contacts 50 are used. 18 individual linear rolling contacts 50 are in each spiral shaped line of holes in separator plate 60, in this embodiment there are six spiral shaped lines of holes. Thus, six linear rolling contacts 50 roll over and contact each circular trace 31 on electrical receiver disk one 30 and over each circular trace 164 on electrical receiver disk one 160.

Also, the number and size of the linear rolling contacts can be reduced or increased, the number of holes in each spiral line of holes can be increased or decreased, the number of spiral line of holes can be increased or decreased, and the number and size of each circular traces on each electrical receiver disk can be reduced or increased, all depending on user requirements. For example, one could increase or decrease the number of circular traces 31 on electrical receiver disk one 30, or increase or decrease the size of the circular traces 31. All these design choices will increase or decrease in the overall diameter of the overall slip ring assembly.

FIG. 6 discloses the assembly of side two of electrical receiver disk two 160, hook-up wire set two 90 having 18 individual wires, and the 18 linear traces 162 on electrical receiver disk two 160. As with electrical receiver disk one 30, the circular traces 164 (shown in FIG. 7A) on electrical receiver disk two 160 are on side one and the linear traces 162 are on side two.

Electrical power comes through hook-up wire set two 90 to linear traces 162 through ground flat solder connections 163. In the preferred embodiment (again, as disclosed for electrical receiver disk one 30, and for the same reasons), the ground flat solder connections 163 of electrical receiver disk two 160 should not exceed 0.018 inches. As one of ordinary skill in the are would realize, and for the wire and trace connections on electrical receiver disk one 30, after removing solder from the hook-up wire set 90 and ground flat solder connections 163 one should ensure a good electrical connection still exists between the linear trace 162 and hook-up wire set two 90 on electrical receiver disk two 160.

Figure 7:
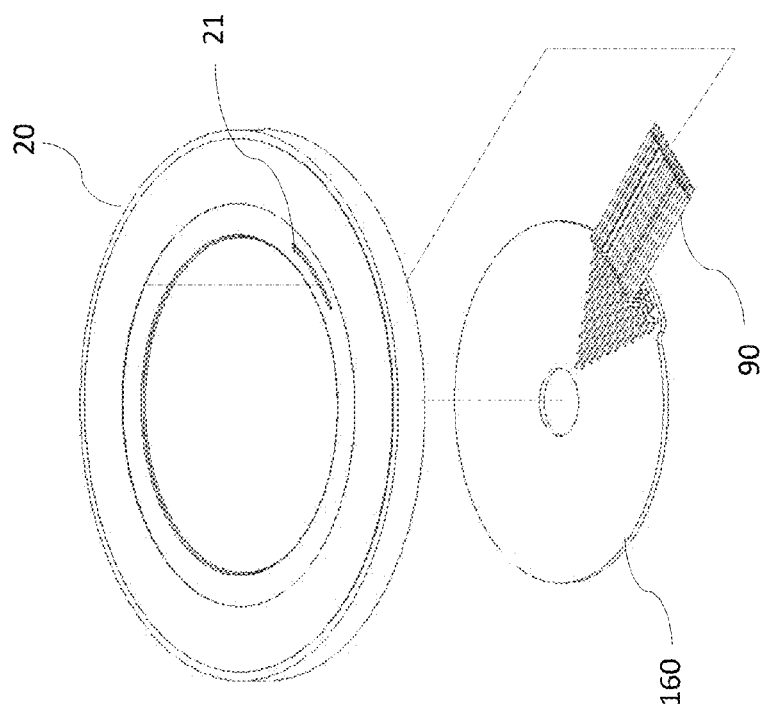
FIG. 7 is an exploded isometric view of slip ring parts in FIG. 6 combined with the top lid of the outer shell.

FIG. 7 shows assembled electrical disk two 160 and hook-up wire set one 90 installed into top lid 20 by inserting each wire of hook-up wire set one 90 through the exit port in top lid 21. These wires are inserted from the underside of the top lid 20 and through top lid 20 protruding out of top lid 20, as seen in FIG. 7—protruding hook-up wire set two 90.

Figure 7A:
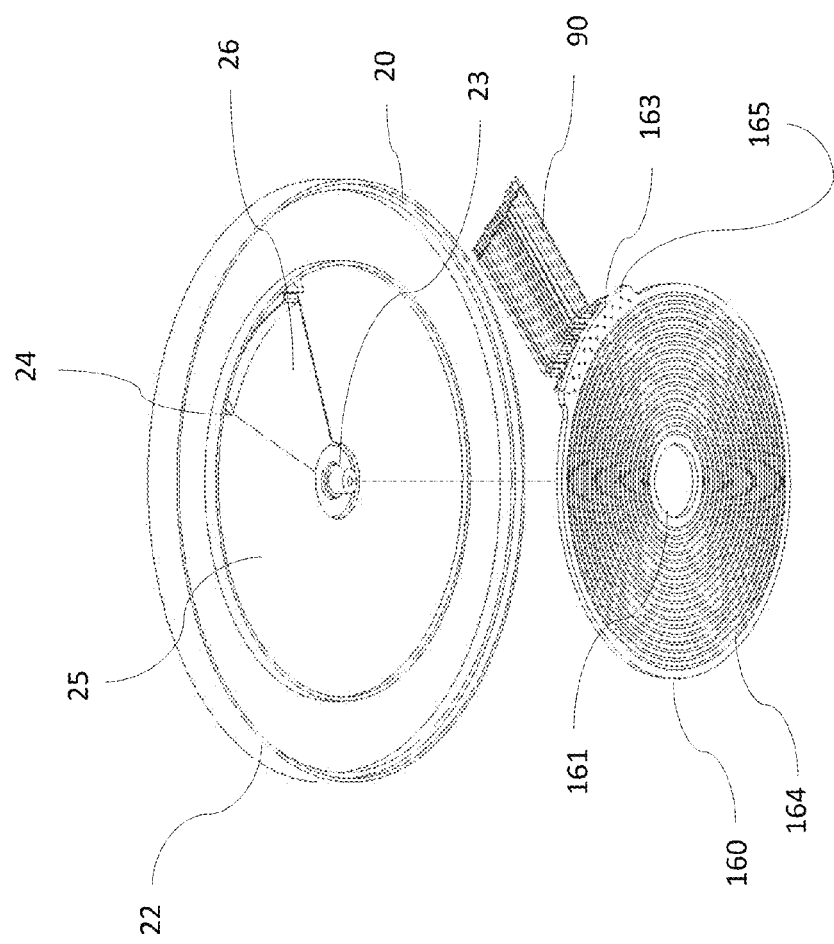
FIG. 7A is an isometric view of slip ring parts in FIG. 7, side one of electrical receiver disk two and the under side of the top lid.

FIG. 7A, as noted, shows needle roller bearing cage 22 in the top lid 20, and shows side one of electrical receiver disk two 160, containing circular traces 164. Within top lid 20 is trace cavity 26 which gives clearance to the linear traces in electrical receiver disk two 162 (shown if FIG. 6) on side two of the electrical receiver disk two 160. This cavity 26 prevents electrical shorts when pressure load is applied to the slip ring during operation. Additionally, cavity 25 is where electrical receiver disk two 160 is located.

FIG. 7A shows the underside of top lid 20. Bearing shaft 23 centers electrical receiver disk two 160 but does not contact electrical receiver disk two 160, (the far side of electrical receiver disk two 160, side two, not seen in FIG. 7A, are linear traces 162.) Electrical receiver disk two 160 located flat into the underside of top lid 20, is centered by mounting hole 161 on bearing shaft 23, and positioning tab 165 between two anti-rotation bosses 24 in the top lid 20. These anti-rotation bosses 24 (as noted with electrical receiver disk one 30) prevent electrical receiver disk two 160 from twisting within the top lid 20 during operation.

Figure 8:
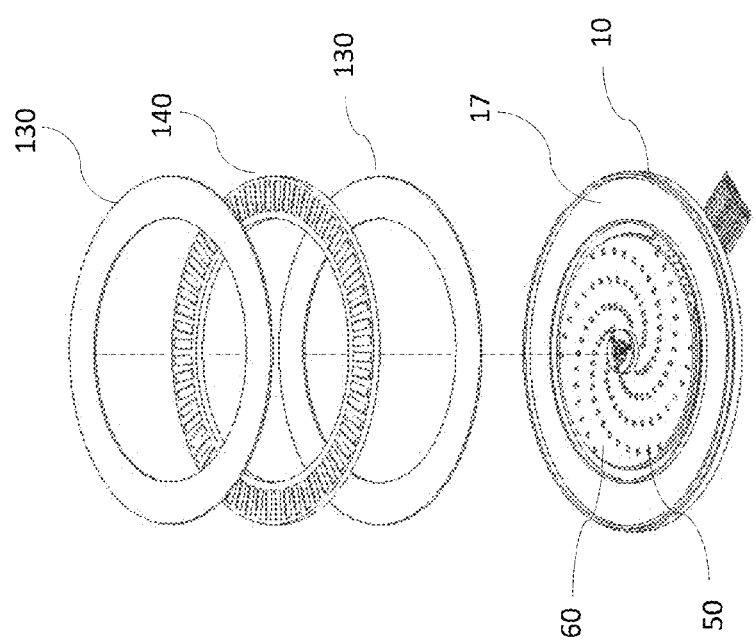
FIG. 8 is an isometric view of the slip ring parts in FIG. 5 and the pressure supporting component parts of the overall slip ring.

FIG. 8 shows the assembly of the two needle roller bearing washers 130 and the needle roller bearing assembly 140. The first needle roller bearing washer 130 is placed within the needle roller bearing cage 17, ensuring the stability and location of the separator plate 60, especially seated linear rolling contacts 50, a critical part in the overall functioning this embodiment of the disclosed invention.

As noted above, the position of the needle roller bearing 140 is set so it bears the external pressure load, and there are multiple variations for the position of needle roller bearing 140, as previously described. Any those positions could work as long as the external load pressure on the overall slip ring is on the needle roller bearing 140. FIG. 8 also shows needle roller bearing assembly 140 located between two needle roller bearing washers 130, and the overall roller bearing assembly 140 is located in needle roller bearing cage 17 in bottom pan 10.

Figure 9:
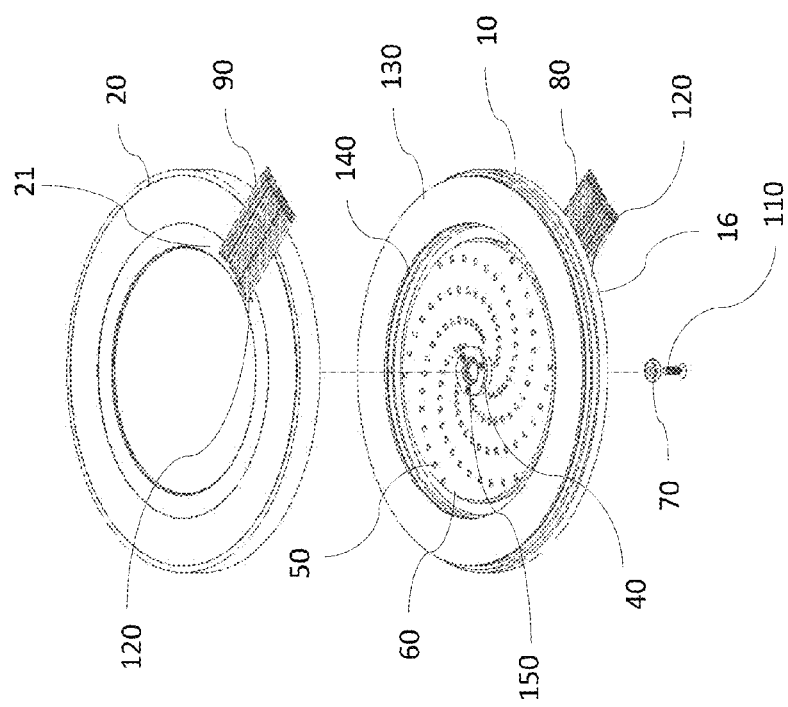
FIG. 9 is an isometric view combining the slip ring parts disclosed in FIG. 5 and FIG. 8.
Figure 10:
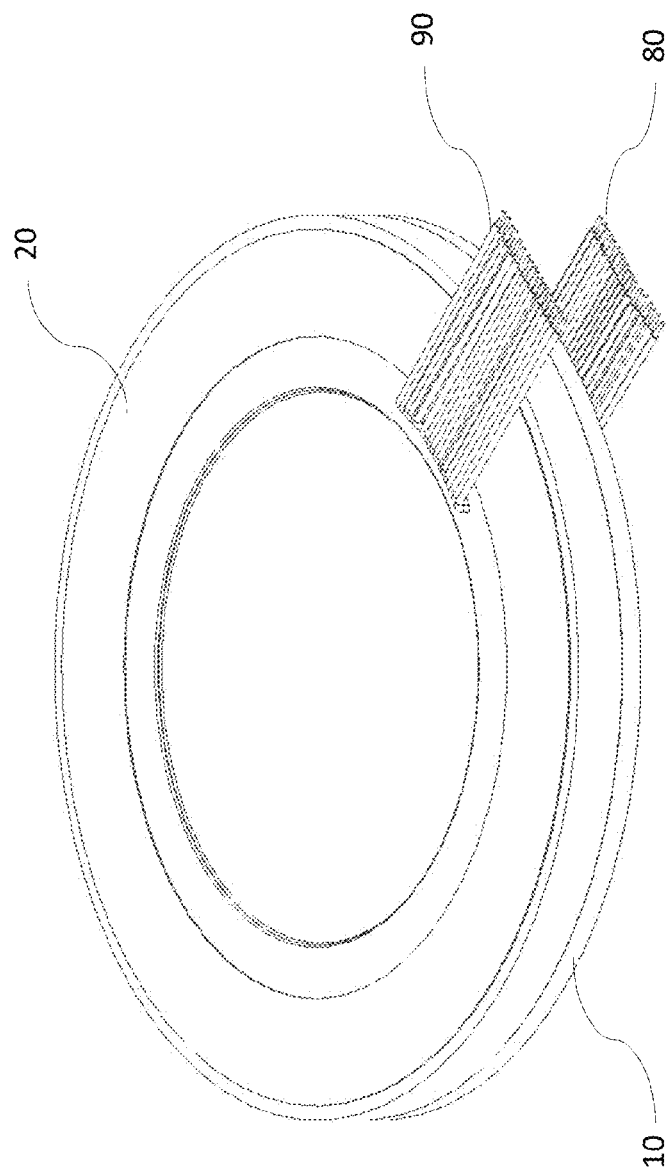
FIG. 10 is an isometric view of the slip ring in its final assembled form.

FIGS. 9 and 10 show the assembly of the slip ring of this embodiment. Top lid 20, shown in FIG. 7 and FIG. 7A, fits into the bottom pan 10 onto bearing shaft 23 of top lid 20, through bearing outer race retainer 40 and into bearing assembly 150, while the needle roller bearing washers 130 remain above and below needle roller bearing assembly 140. Finally, tightened screw 110, placed through bearing inner race retainer 70 is located up through the middle of all the slip ring's central parts, holding them all together.

The embodiment disclosed above will hold weights of up to 1000 pounds onto the top lid 20. Those of ordinary skill in the mechanical and electrical arts of slip ring design will know how to test the disclosed embodiment, providing a support structure that allows a gap sufficiently wide and deep enough and preventing hook-up wire set one 80 from being crushed. Additionally, testing could include placing a weight of up to 1000 pounds onto the top lid 20. Once the weight is applied, testing could include applying voltage of approximately 12 volts at 2 amperes, 24 watts, to a pair of wires on hook-up wire set one 80 then rotating the weight and checking for continuity breaks as the external weight on the slip ring rotates through the matching set of wires in hook-up wire set two 90. After testing the working of the weight bearing slip ring, one of ordinary skill would know to apply sealant 120 to all paired sets of the slip ring, to the hook-up wire set one 80 at the exit port hook-up wire set one bottom pan 16 and to hook wire set two 90 at the exit port hook-up wire set two 21 on top lid 20.

OTHER EMBODIMENTS

As previously noted, one embodiment for the weight bearing slip ring has external weight pressures focused more towards the inner perimeter of the slip ring. One way to accomplish this is to use a smaller load bearing ring. This smaller load bearing ring would have one smaller needle roller bearing assembly, two needle roller bearing washers of approximately the same size, one fitting above and one below the needle roller bearing assembly, and through the center of the smaller load bearing ring a center shaft of the slip ring could fit. This shaft would house a support structure on which the weight supporting slip ring would rest. The rotating unit is then placed on the top lid of the basic weight supporting slip ring. In this embodiment the external pressure load from the external weight would press more towards the inner portion of the slip ring, and the location of the electrical receiver disks would surround the needle roller bearing assembly (instead of the needle roller bearing assembly surrounding the electrical receiver disks).

Another embodiment has the load bearing unit on a different plane than the electrical receiver disks. Typically in a pancake style slip ring all components are on the same plane or in a tubular style all of the contacts align to the internal shaft. Again, as previously noted, the weight supporting slip ring can be a top hat shape where the electrical receiver disks can either be above or below the load carrying unit, allowing the electrical receiver disks closer or farther from other components within the system. This distance is very flexible, as long as the electrical receiver disks and the load carrying unit are concentrically aligned.

Another embodiment uses the outer shell (top lid 20 and bottom pan 10) of the slip ring to support external weights. For example, manufacturing the outer shell from steel, certain plastic or other materials capable of bearing large weights, would balance the weight bearing capability of the slip ring be inner shell components slip ring components like needle roller bearings.

Additionally, a three-receiver disk embodiment is also possible. This embodiment has an upper, middle and lower receiver disk. The middle receiver disk could receive the input electrical signals, and two separator plates above and below the middle receiver disk would transfer those input electrical signals to the upper and lower receiver disks, and the outer shell would be designed to support the additional receiver disks.

Also, a middle receiver plate and housing could provide the necessary support for the load carrying unit, using either an inner perimeter load carrying unit or an outer load carrying unit or any combination of the two.

Additionally, one could have the load carrying unit on a different plane than the electrical receiver disks, and also have multiple planes, multiple electrical receiver disks and separator plates, all in different variations according to different electrical and weight bearing requirements, supporting multiple loads and different electrical transfers within one overall single slip ring design.

The main embodiment disclosed above disclosed six linear rolling contacts 50 on the circular traces in electrical receiver disk one 30 and on electrical receiver disk two 160. But, as noted, one could use more or less spiral rings of holes on the separator plate (or separator plates in a multileveled receiver disk design of three of more electrical receiver disks, each pair of electrical receiver disks with a separator plate between them); one could also increase or decrease the size of the linear rolling contacts; increase or decrease the number of linear rolling contacts (and reduce or increase the number of holes in each spiral line of holes); and increase or decrease the number and size of each circular trace on each electrical receiver disk. All these design choices would be dependent on either electrical current draw, the sensitivity of signal transfer, or other requirements on the electrical current and electrical signals.

Also, instead of using wires (hook-up wire set one 80 and hook-up wire set two 90) directly connected to the linear traces in electrical receiver disks to transfer the current or signals to the receiving equipment, connectors can be used and mounted directly to the electrical receiver disks. These connectors could pass through the outer shell (the top lid or bottom pan) allowing a harness to connect to the slip ring. Of course the style and type of connector used would have to fit the slip ring's outer shell.

Finally, the slip ring design embodiments disclosed herein allow for a wide variety of design factors. Designs could identify which connecting wires or connector pins are needed to draw more current or which pair of circular traces required to be impedance balanced to meet specific user requirements, and adjust the slip ring design accordingly.

Configuration of the weight supporting slip ring is dependent on upon a number of factors such as the number of wires needed, the current draw required, the actual shape of the slip ring desired, external weight loads, and the choice of the type of wire or connectors to fit design requirements. With the slip ring embodiments disclosed herein one has the ability to develop a specialized slip ring meeting a wide variety of requirements and allow the slip rings to fit into an existing product without having to redesign the product to accommodate a bulky slip ring design.

As can be seen in the above information, this new weight supporting slip ring is a vast improvement in savings of design time, and material and product complexity. The disclosed weight bearing slip ring embodiments (a) allow significant external weights on the outer shell of the slip ring, (b) improve the mechanical performance of the slip ring by simplifying the slip ring operation, (c) eliminate wires from dangling on movable joints; and (e) provide simplified access to the slip ring for maintenance or slip ring replacement.

Although the present invention has been described with reference to preferred embodiments, numerous other features and advantages of the present invention are readily apparent from the above detailed description, plus the accompanying drawings, and the appended claims. Those skilled in the art will recognize that changes may be made in form and detail without departing from the spirit and scope of the disclosed invention.

I claim:

1. A weight bearing slip ring, comprising:
   a circular slip ring of standard construction having a top lid outer shell and bottom pan outer shell encasing the slip ring, a stationary part and a rotating part of the slip ring and transferring electrical current therethrough, and
   a needle roller bearing assembly positioned around the slip ring so it bears any external weight load on the slip ring; and
   circular parts of the slip ring and the needle roller bearing assembly are concentric to each other;
   whereby when excessive weights press onto the external shell of the slip ring, the needle roller bearing assembly bears the weight pressure and prevents the external weights from hindering the operation of the slip ring.

2. The weight bearing slip-ring according to claim 1, including a trace cavity in the top lid outer shell and in the bottom pan outer shell which trace gives clearance to linear traces on a second side of electrical receiver disks preventing any electrical shorts when external pressure is applied to either side of the outer shell.

3. The weight bearing slip-ring according to claim 1, including a weight-bearing-outer-shell covering the slip ring, providing more weight bearing support for the internal needle roller bearing assembly.

4. The weight bearing slip ring according to claim 1, wherein the needle roller bearing assembly is positioned lower than the slip ring parts.

5. The weight bearing slip ring according to claim 1, wherein the needle roller bearing assembly is positioned on the same plane with the slip ring parts.

6. The weight bearing slip ring according to claim 1, wherein the needle roller bearing assembly is positioned higher than the slip ring parts.

7. The weight bearing slip ring according to claim 1, wherein the needle roller bearing assembly is within the slip ring and is located around a center hole of the circular slip ring parts, wherein external weights have a more central pressure on the slip ring outer shell.

8. The weight bearing slip ring according to claim 1, wherein the needle roller bearing assembly includes two flat, hardened steel ring plates located above and below the needle roller bearing assembly.

9. The weight bearing slip ring according to claim 1, including
   electrical receiver disk one having a first and a second side, the first side has at least one row of an electrically separate, electrically conductive ring, and the second side has at least one electrically conductive linear trace electrically connected through the electrical receiver disk to one of the electrically conductive rings on side one;
   electrical receiver disk two having a first and a second side, the first side has at least one row of an electrically separate, electrically conductive ring, and the second side having at least one electrically conductive linear trace electrically connected through the electrical receiver disk to one of the electrically conductive rings on side one;
   a separator plate of non-conductive material placed between electrical receiver disks one and two, the separator plate having at least one spiral pattern of holes going through the separator plate, each hole containing a small linear rolling contact, and being in continuous rolling contact with both the electrically conductive rings on electrical receiver disks one and two, and each linear rolling contact providing consistent electrical conduction between electrical receiver disks one and two through the separator plate.

10. The weight bearing slip-ring according to claim 9, wherein the separator plate has at least one spiral pattern of holes going through the separator plate, each spiral pattern of holes having linear rolling contact, of variable size, whereby at least one linear rolling contact engages each electrically conductive ring on each electrical receiver disk providing at least one rolling line of contact on electrically conductive ring, thereby providing a consistent electrical connection between the electrical receiver disks.

11. The weight bearing slip-ring according to claim 9, wherein the separator plate has six spiral pattern of holes going through the separator plate and each electrically conductive ring on each electrical receiver disk has six rolling lines of electrical contact from the linear rolling contacts.

12. A weight bearing slip-ring, comprising
   a first and second electrical receiver disk, each disk having a series of at least one row of electrically separate, electrically conductive rings;
   a circular separator plate of non-conductive material placed between the first and second electrical receiver disks, the separator plate having at least one spiral shaped series of holes through the separator plate, the spiral shaped series of holes going from approximate center of the separator plate to the approximate edge of the separator plate; and
   at least one of the holes in the separator filled with a small linear rolling contact, each linear rolling contact being electrically conductive and transmitting electrical current through the contact as is rolls over the circular traces in first and second electrical receiver disks of the slip ring, and transmiting electrical current therebetween.

13. The weight bearing slip-ring according to claim 12, wherein the first and second electrical receiver disks have eighteen rows of electrically conductive rings, the separator plate has six spiral shaped series of holes, each spiral shaped series of holes has eighteen holes, and six rolling linear contacts roll on each electrically conductive ring in the first and second electrical receiver disks, providing consistent, uninterrupted, stable current flow between the electrical receiver disks.

14. The weight bearing slip-ring according to claim 12, wherein spiral shaped series of holes in the separator plate is decreased to meet different electrical requirements.

15. The weight bearing slip-ring according to claim 12, wherein spiral shaped series of holes in the separator plate is increased to meet different electrical requirements.

16. The weight bearing slip-ring according to claim 12, wherein the electrically separate, electrically conductive rings on the electrical receiver disks are increased to meet different electrical requirements.

17. The weight bearing slip-ring according to claim 12, wherein the electrically separate, electrically conductive rings on the electrical receiver disks are decreased to meet different electrical requirements.

18. The weight bearing slip-ring according to claim 12, including another separator plate and receiver disk, the overall slip ring then having upper, middle and lower receiver disks; the middle receiver disk receiving input electrical signals, and the two separator disks above and below the middle receiver disk transferring those input electrical signals to the upper and lower receiver disks, and an outer shell designed to encase the additional receiver disks, and a middle receiver disk providing the necessary support for the load carrying unit.

19. The weight bearing slip-ring according to claim 12, including connectors mounted on the electrical receiver disks, the connectors pass through an outer slip ring shell and connecting to a harness.

20. A weight bearing slip ring, comprising:
- A) a top lid of an outer shell having an exit port and a first set of electrically conductive wires fed through the exit port;
- B) a bottom pan of an outer shell having an exit port and a second set of electrically conductive wires fed through the exit port;
- C) circular electrical receiver disk one having a first and a second side, side one having at least two electrically separate, electrically conductive circular traces, and side two having at least two electrically separate, electrically conductive linear traces, and each linear trace electrically connected to one circular trace through electrical receiver disk one;
- D) a separator plate having at least one spiral pattern of holes, each hole going through the separator plate, the spiral pattern of holes winding out from the approximate center of the separator plate to the approximate edge of the separator plate;
- E) a set of small linear rolling contacts, each contact fitting into a hole of the spiral pattern of holes in the separator plate, freely rotating therein;
- F) circular electrical receiver disk two having a first and a second side, side one having at least two electrically separate, electrically conductive circular traces, and side two having at least two electrically separate, electrically conductive linear traces, and each linear trace electrically connected to one circular trace through electrical receiver disk two;
- G) a needle roller bearing assembly machined to bear significant weights and the needle roller bearing assembly positioned within the outer shell of the slip ring to bear any weight applied to the outer shell of the slip ring;
- wherein the top lid and the bottom pan interconnect and fit together and the electrical receiver disks and the separator plate between the electrical receiver disks align, and the small linear rolling contacts in the separator plate roll freely on the circular traces of both electrical receiver disks, allowing consistent, steady, uninterrupted flow of electrical current from between the rotating and stationary electrical receiver disks; and
- at least one wire from the first set of electrically conductive wires is connected a one linear trace in the second side of electrical receiver disk one and at least one wire from the second set of electrically conductive wires is connected a linear trace in the second side of electrical receiver disk two, and permitting the transfer of electrical current through one wire set, through the slip ring to the other wire set, during the operation of the slip ring; bearing significant weight on the top or bottom outer shell of the weight bearing slip ring.

* * * * *